United States Patent
Theysohn

[11] 3,902,835
[45] Sept. 2, 1975

[54] EXTRUSION APPARATUS WITH TWO PART OPENABLE HEAD

[76] Inventor: Helmuth Theysohn, Wiehbergstrasse 25 C, 3 Hannover, Germany

[22] Filed: July 25, 1973

[21] Appl. No.: 382,562

[30] Foreign Application Priority Data
July 25, 1972 Germany............................ 2236363

[52] U.S. Cl. ............... 425/188; 425/192; 425/380; 425/467
[51] Int. Cl. .............................................. B29f 3/04
[58] Field of Search ........... 425/461, 467, 376, 380, 425/466, 450 C, 182, 188, 190, 192

[56] References Cited
UNITED STATES PATENTS

| | | | |
|---|---|---|---|
| 2,918,714 | 12/1959 | Garvey | 425/188 |
| 3,195,186 | 7/1965 | Gauban et al. | 425/450 C X |
| 3,488,807 | 1/1970 | Vossen | 425/192 |
| 3,535,738 | 10/1970 | Vossen | 425/192 |

*Primary Examiner*—Robert D. Baldwin
*Assistant Examiner*—Mark Rosenbaum
*Attorney, Agent, or Firm*—Robert E. Burns; Emmanuel J. Lobato; Bruce L. Adams

[57] ABSTRACT

The extrusion head of a wide profile extruder is divided into two halves which are hingely mounted on the front end of the barrel of the extruder so as to swing outwardly away from one another and away from the barrel when it is desired to open the extrusion head for cleaning. The two halves of the head are swingable through a sufficient angle to permit removal of the extrusion screw from the front end of the barrel. Hydraulically operated clamps are engageable with wedge surfaces provided on the two halves of the extrusion head so as to exert forces in a direction to force the two halves together and also toward the front end of the barrel thereby providing a tight closure capable of resisting the high forces generated in the extruder during operation. The clamps are hingely mounted on opposite sides of the barrel so that they can be swung out of engagement with the two halves of the extrusion head to permit opening of the head.

6 Claims, 8 Drawing Figures

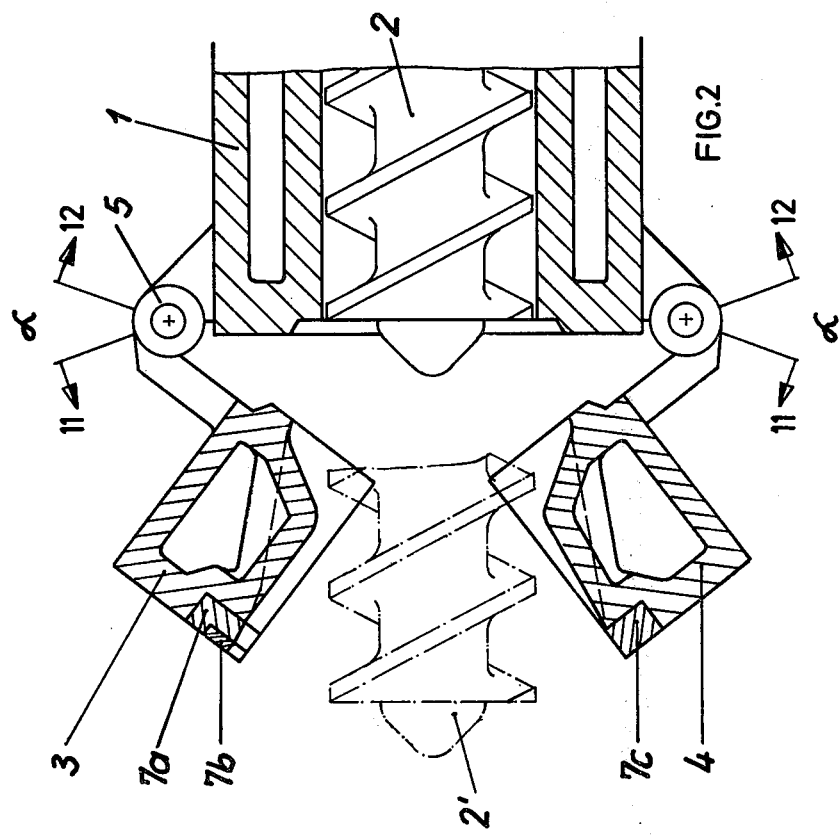
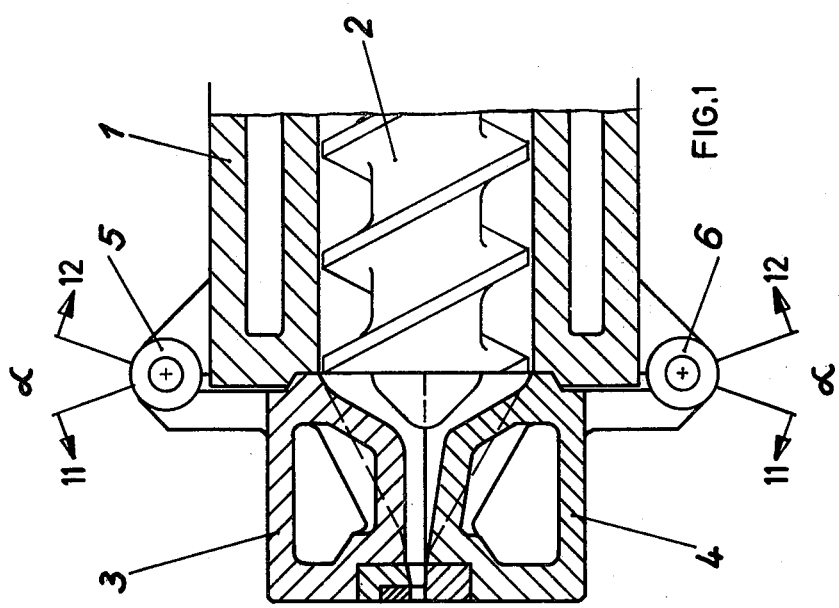
FIG.2
FIG.1

EXTRUSION APPARATUS WITH TWO PART OPENABLE HEAD

The present invention relates to extrusion apparatus and particularly to an extrusion head for the production of wide webs or profiles of plastic materials, for example rubber or plastic composition especially for the running strips of automotive vehicle tires.

These extrusion heads have a fish tail inner contour to provide a transition from the circular cross section of the extruder cylinder to the flat form of the extrusion orifice. In the use of the extrusion apparatus it is necessary for the head to be opened for cleaning whenever the extrusion mixture is changed or when the apparatus is to be left idle. In order for the cleaning to be carried out in the shortest possible time, known extrusion heads of this kind are divided in a horizontal plane so that they can be opened. In accordance with a construction that has been known for many years, the two halves of the extrusion head have been secured together by screws and the resulting extrusion head assembly has been secured by screws to the cylinder or barrel of the extruder. By reason of the high separating forces generated during use of the extruder a large number of screws has been necessary and the loosening and tightening of these screws has necessarily required a considerable amount of time. Efforts have accordingly been made to reduce the number of screws.

According to one proposal the screws for securing the extrusion head to the cylinder are replaced by a quick action bayonet joint. However, after removal of the head from the cylinder the screws holding the two halves of the head together still have to be removed.

All other known constructions proceed basically on the principle that during cleaning one half of the extrusion head, usually the lower half, is left secured to the extrusion cylinder by screws or the like while the other half is raised by means of a lifting apparatus or is swung out by a pneumatic or hydraulic cylinder.

In one of these known constructions the screws for holding the two halves of the extrusion head together are replaced by clamps which have conical gripping faces and hold the two halves of the extrusion head together along a horizontal plane by a few screws or by means of a hydraulic cylinder. This connection can be released relatively rapidly. However, it is still necessary to secure the extrusion head to the cylinder by a large number of screws which are difficult to tighten and remove.

A further reduction in the number of fastening screws is achieved by the extrusion head construction described in German specification No. 1,729,618. In this construction the hinged upper extrusion head half is screwless. It is pressed against the lower half of the extrusion head and also against the extrusion cylinder by a common force which coincides with the resultant of the two contact forces. However, the lower half of the extrusion head is secured to the extrusion cylinder by screws.

The known constructions referred to above have the following disadvantages:

1. One or both halves of the extrusion head are secured to the extrusion cylinder of the extruder by a plurality of screws which require a considerable amount of time for loosening and tightening. Moreover, the simultaneous and important withdrawal of the extrusion screw for cleaning places a further burden on the operating personnel. Moreover, the screws are sensitive to abnormal overloading so that a penetration of the material being extruded in between the sealing faces of the head can lead to the breaking of the screws.

2. Even after the upper half of the extrusion head has been removed or swung out, the cleaning of the wide tip extrusion head is impeded because the material being extruded, for example the rubber mixture remains adhered in the narrow passage between the extrusion screw and the wedge shaped displacement tip of the lower head half.

3. The extrusion screw undergoes a constant erosion. It must hence often be replaced or reconditioned. As the extrusion screw when being changed must be drawn out through the discharge end of the cylinder, it is necessary with known constructions of wide extrusion heads to dismount the head completely and later reinstall it on the cylinder. This means removing and later replacing screws which is very time consuming.

The present invention avoids these disadvantages. In accordance with the invention both parts of a two part wide tip extrusion head are hinged and are locked in closed position in a simple manner by hydraulically operated pressure means.

The problem is solved in the following manner. The cylinder of the extruder at its discharge end is provided top and bottom with two hinge positions in which the upper part as well as the lower part of the wide tip extrusion head are rotatably mounted. Through mechanical, pneumatic or hydraulic positioning elements, the two head halves can be brought into the working position in front of the cylinder or can be opened by movement in the reverse direction. The opening angle is so great that in this position not only can the material remaining in the wide tip head be removed without effort but also the extrusion screw or worm can when necessary be changed by being drawn out of the front end of the cylinder without demounting either extrusion head part.

As the pressure of the material being extruded can amount to 150 atmospheres, the joint between the head halves themselves as well as the joint between both head halves and the extrusion cylinder require correspondingly high closing forces. In accordance with the invention these forces are produced by two double wedge clamps which are mounted on double acting hydraulic cylinders which in turn are swingably mounted on opposite sides of the extrusion cylinder. Both double wedge clamps comprise respectively two wedges with equal wedge angles disposed on opposite sides of the upper and lower parts of the wide tip extrusion head. Upon actuation of the hydraulic cylinder in a closing direction both extrusion halves are not only held together with the required pressure but also at the same time are pressed against the extrusion cylinder through the double wedge construction of the clamps and wedges. The wedge angle is so selected that the pressing forces are in correct relation to the values of the separating forces in both planes.

The hydraulic cylinders are so dimensioned that taking into consideration the surface friction of the wedges, a surface pressure on the sealing surfaces is attained which with certainty prevents leakage of the material being extruded.

In order to keep wear at a minimum, the preferably interchangeable wedge surfaces are hardened and ground. A further wear reduction is attained through the incorporation of roller bearings in the wedge parts.

When it is desired to open the extrusion head the hydraulic cylinders are actuated in an unloading direction and then both cylinders together with the double wedge clamps mounted thereon are swung sufficiently to the side to free the wedge projections on the extrusion head halves. The opening of the head is then effected in known manner for example, through a hydraulically actuated swinging cylinder or rotary drive.

With the extrusion head in accordance with the present invention no screws are required to join the two halves of the head to one another or to the extrusion cylinder. The head can thereby be opened quickly and cleaned without effort. Moreover, the extrusion head in accordance with the invention makes it possible to change the extrusion worm without in any way demounting the extrusion head parts. A further advantage is that owing to the wedge action with the mechanical distribution through the double wedge clamps, very high closing forces can be produced with relatively small and hence inexpensive hydraulic cylinders.

The nature, objects and advantages of the invention will be more fully understood from the following description of a preferred embodiment shown by way of example in the drawings in which:

FIG. 1 is a section through a two part openable extrusion head on the cylinder of a worm type extruder in working position;

FIG. 2 is a similar section with the extrusion head shown in open position;

Figure 4:
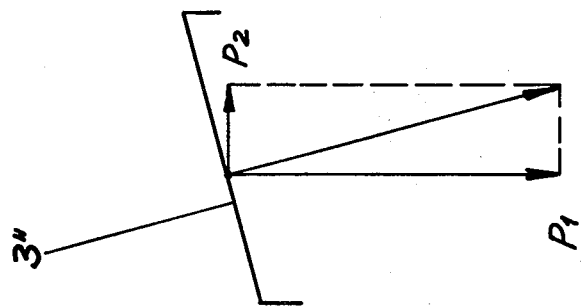
FIG. 4 is a force diagram illustrating the working of the wedge connection.

In the embodiment shown by way of example in the drawings, the extruder comprises an extrusion cylinder or barrel 1 in which a feed screw or worm 2 is rotatable. Only the discharge end portion of the cylinder is shown in the drawings as other portions of the cylinder and the means for rotating the worm 2 are conventional. A wide tip extrusion head at the discharge end of the cylinder 1 comprises an upper half 3 which is swingably mounted by a hinge 5 on the upper part of the cylinder and a lower half 4 which is swingably mounted by a hinge 6 on the underside of the cylinder. In the embodiment illustrated in the drawings the extrusion head halves 3 and 4 are provided with interchangeable tools or dies 7a, 7b and 7c which are mounted in the wide tip extrusion head halves in known manner, to define an extrusion orifice or tip T (FIG. 6) which is wide, compared with the effective width or clear diameter of the barrel 1.

Figure 3:
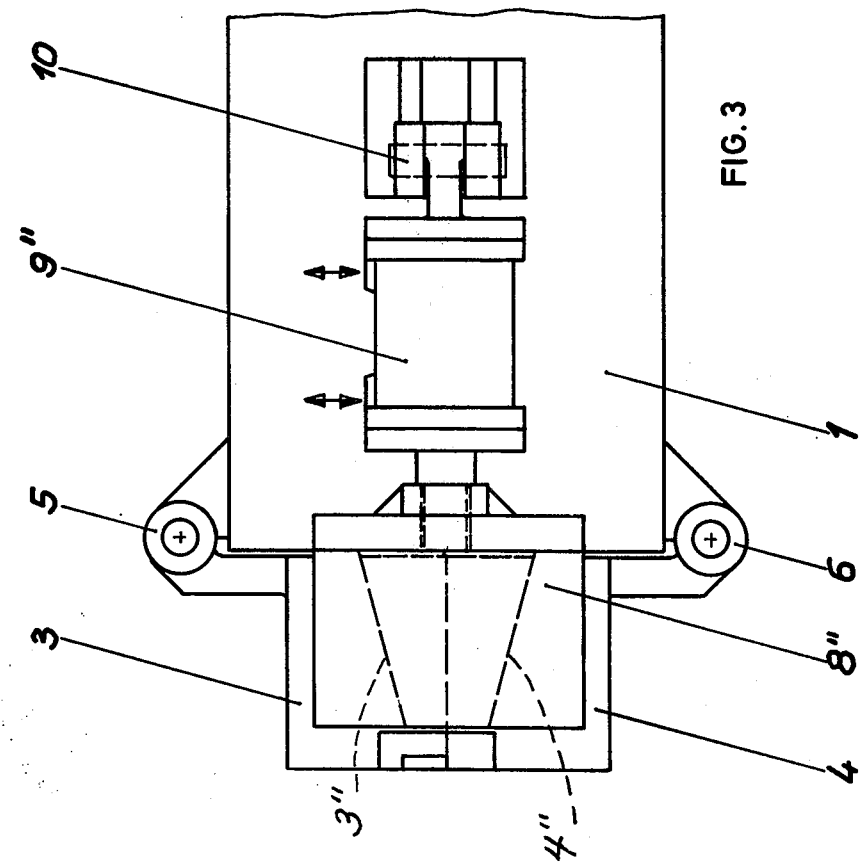
FIG. 3 is a side view of the wide tip extrusion head of FIG. 1 showing a double wedge clamp with a hydraulic cylinder.
Figure 6:
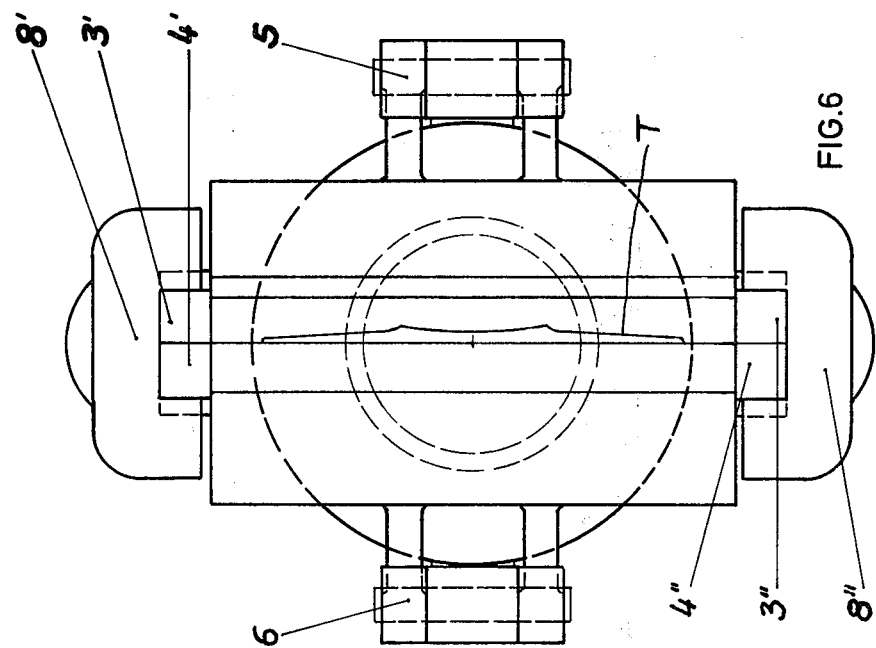
FIG. 6 is an end view taken from the left hand end of FIG. 5.

On opposite sides of the wide tip extrusion head halves 3 and 4 there are provided wedge shaped projections 3', 3'', 4' and 4'' respectively (see FIGS. 3 and 6). As will be seen from FIG. 3 the wedge shaped projections at each side of the extrusion head have rearwardly diverging cam surfaces. These surfaces extend substantially the entire length of the extrusion head in a direction axial of the extrusion cylinder.

The wedge shaped projections on opposite sides of the extrusion head are engageable by double wedge clamps 8' and 8'' which are fixed respectively on the piston rods of hydraulic cylinders 9' and 9''. The hydraulic cylinders are double acting so as to move the double wedge clamps selectively in opposite directions. Suitable means which is only schematically indicated in the drawings is provided for supplying pressure fluid selectively to opposite ends of the hydraulic cylinders. The cylinders 9' and 9'' are swingably mounted on opposite sides of the cylinder 1 by means of hinge mountings 10' and 10''.

Figure 5:
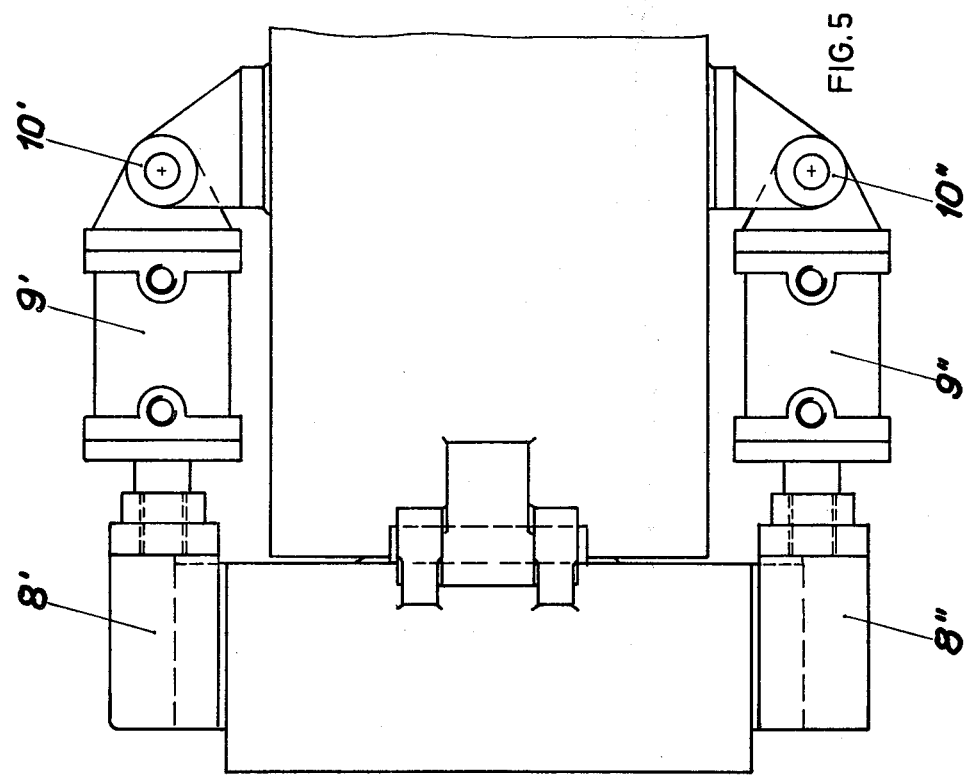
FIG. 5 is a plan of the wide tip extrusion head of FIG. 1 showing the position of both double wedge clamps in working position of the extrusion head.

The interengaging surfaces of the wedge projections 3', 3'', 4' and 4'' provided on opposite sides of the extrusion head halves 3 and 4 and the clamping members 8' and 8'' are so disposed that when the clamping members are moved rearwardly (toward the right as seen in FIGS. 3 and 5), the two halves of the extrusion head are pressed together. FIG. 4 shows the forces acting on one of the like wedge faces 3''. The wedge angle is so selected that the relation between the force P1 acting in a vertical direction to press the two halves of the extrusion head together to the force P2 which acts in a horizontal direction to press the extrusion head halves against the sealing faces at the end of the cylinder corresponds to the separating forces in the respective planes resulting from the pressure of the material being extruded. This relationship should take into account the friction forces between the surfaces of the wedge projections on the extrusion head halves and the clamping members. As shown by way of example in the drawings, the wedge surfaces are inclined at an angle of about 15° to the axis of the extrusion cylinder. However, it will be understood that this angle will vary according to the parameters affecting the separating forces between the two halves of the extrusion head and between the extrusion head and the cylinder respectively.

Figure 8:
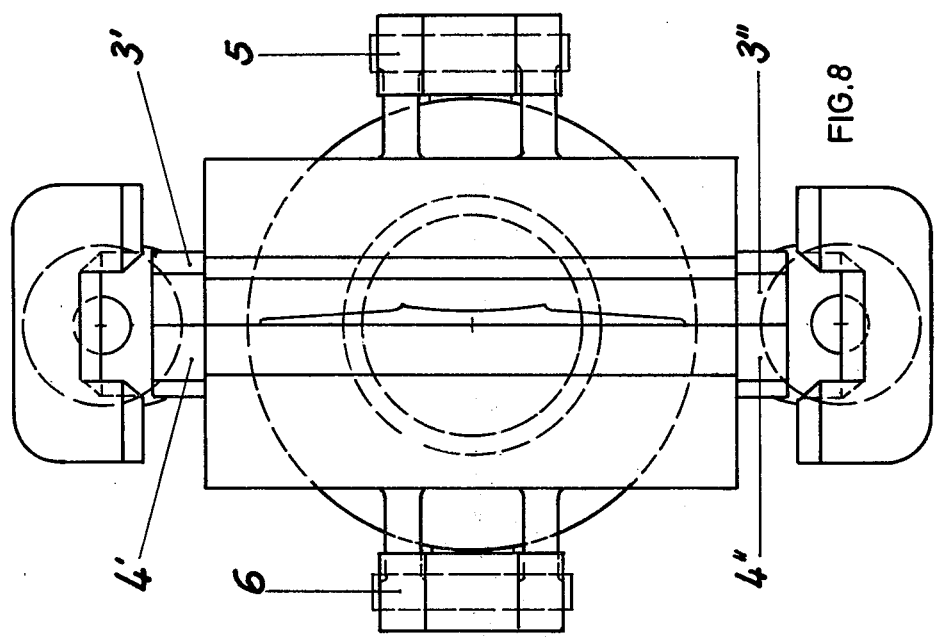
FIG. 8 is an end view taken from the left hand end of FIG. 7.
Figure 7:
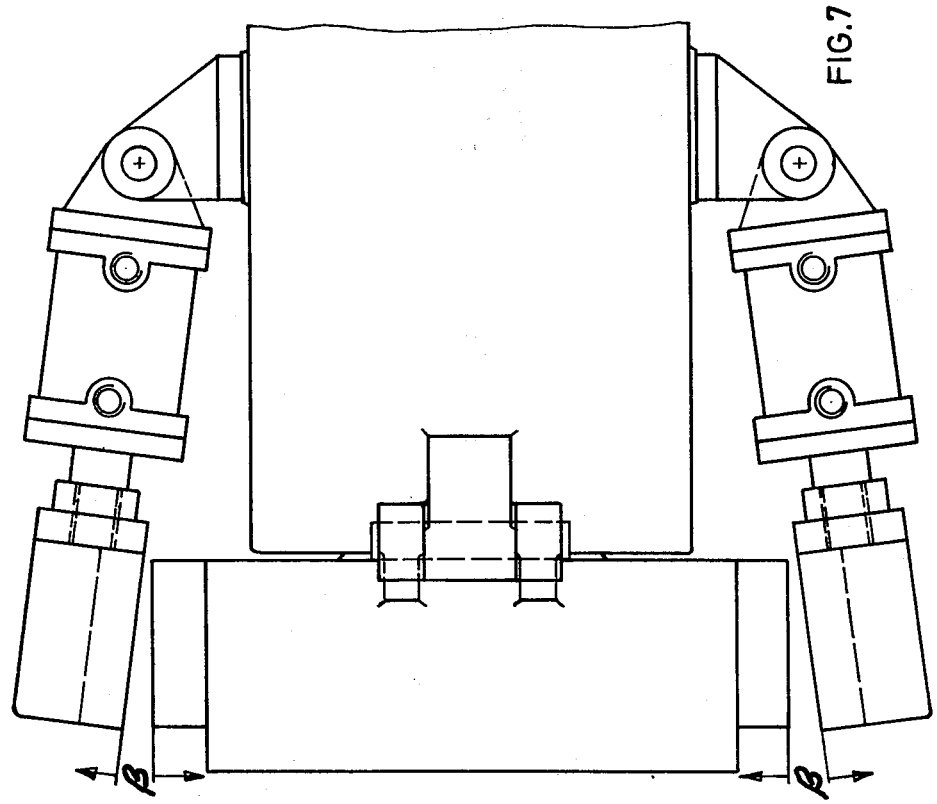
FIG. 7 is a plan view of the wide tip extrusion head of FIG. 1 in a position preparatory to opening of the head.

In FIGS. 5 and 6 the double wedge clamps 8' and 8'' are shown in operative position to apply closing forces to the extrusion head. In FIGS. 7 and 8 the clamps 8 and 8' are shown swung outwardly about the hinges 10 and 10' to permit the opening of the head for cleaning.

The wide tip extrusion head in accordance with the present invention is brought into operative position in the following manner. The two extrusion head halves 3 and 4 are swung about the hinges 5 and 6 in the direction indicated by the arrows 11 to bring them into the closed position shown in FIG. 1. The two double wedge clamps 8' and 8'' are then swung inwardly from the open position shown in FIG. 7 to the operative position shown in FIG. 5. Pressure fluid is thereupon supplied to the left hand ends of the hydraulic cylinders 9' and 9'' to move the double wedge clamps 8' and 8'' to the right and thereby apply the required closing pressure to the pressure head halves to provide pressure fluid tight seals between the horizontal and vertical sealing faces. With the construction shown only a short piston movement is required. Moreover, by reason of the wedge action, the required sealing pressures can be attained with relatively small hydraulic cylinders.

The closing movement of the two halves of the pressure head can be electrically or mechanically coordinated with the closing movement of the double wedge clamps so that the latter can be put into motion only when the head halves 3 and 4 are fully closed. For example, the clamping members 8' and 8" can be controlled by an electric circuit including contacts operated by the closing of the extrusion head halves.

The opening of the extrusion head is effected in the following manner. Pressure fluid is supplied to the right hand ends of the hydraulic cylinders 9' and 9" to move the double wedge clamps 8' and 8" toward the left and thereby relieve the sealing pressure on the extrusion head halves. The clamps 8' and 8" together with their hydraulic cylinders 9' and 9" are then swung outwardly about the hinges 10' and 10" to the open position shown in FIGS. 7 and 8. The wide tip extrusion head halves 3 and 4 are then swung in the direction of the arrows 12 to the open position shown in FIG. 2. It will be seen that when the extrusion head halves 3 and 4 are in open position the worm 2 can be withdrawn from the forward end of the cylinder 1 as indicated in the broken line showing 2'. The worm 2 can thereby be removed for cleaning, reconditioning or replacement.

Hydraulic, pneumatic or mechanical means may be provided as desired for swinging the extrusion head halves between open and closed positions. In the opening movement as well as in the closing movement, the operation of the extrusion head and the clamps is coordinated for example by electrical or mechanical means in such manner that the opening of the head is possible only when the double wedge clamps with their hydraulic cylinders have been swung to the open position shown in FIG. 7.

While a preferred embodiment of the invention has been illustrated in the drawings and is herein particularly described, it will be understood that the invention is in no way limited to the illustrated embodiment.

What I claim and desire to secure by Letters Patent is:

1. Extrusion apparatus, comprising;
 a barrel;
 an extrusion screw rotatable in said barrel;
 an extrusion head for wide extrusions at the extrusion end of said barrel, said extrusion head comprising two halves both hingedly mounted on said barrel to swing outwardly away from one another through a sufficient angle to permit removal of said screw from said barrel by passing between said extrusion head halves when swung outwardly;
 means for exerting forces on said halves of said extrusion head to press them toward one another and also toward said barrel to provide a pressure tight fluid seal between said halves and a pressure-tight seal between each half and said barrel, said means comprising, cam surfaces on said halves, clamping means engageable with said cam surfaces and means for moving said clamping means in a direction to engage said cam surfaces; said clamping means comprising cam followers and means pivotally mounting said cam followers to swing outwardly out of engagement with said cam surfaces.

2. Extrusion apparatus according to claim 1, in which said extrusion head has a separation plane in which said two halves contact one another in use of the extrusion head, and said cam surfaces comprise symmetrical inclined surfaces on opposite sides of said separation plane of said extrusion head, said inclined surfaces diverging from one another in a direction toward said barrel.

3. Extrusion apparatus according to claim 2, in which said a cam follower is movable in a direction parallel to said separation plane.

4. Extrusion apparatus according to claim 3, in which the inclination of said inclined surfaces is selected to provide clamping forces exceeding forces which tend to separate said extrusion head halves from the barrel and from one another in use of the extrusion head.

5. Extrusion apparatus according to claim 1, in which each of said clamping means comprises a fluid pressure cylinder, means hingedly mounting said cylinder at one end thereof on a side of said barrel, a piston having a piston rod extending from the other end of said cylinder, and means mounting said cam follower on said piston rod.

6. Extrusion apparatus according to claim 5, in which said fluid pressure cylinder is double acting so as to move said cam follower in one direction for clamping said extrusion head halves and in the opposite direction for opening said extrusion head.

* * * * *